US009081345B2

(12) United States Patent
Uchida et al.

(10) Patent No.: US 9,081,345 B2
(45) Date of Patent: Jul. 14, 2015

(54) IMAGE FORMING APPARATUS

(75) Inventors: Wataru Uchida, Yokohama (JP); Tomoyuki Araki, Numazu (JP); Toshiaki Miyashiro, Suntou-gun (JP); Mitsuhiro Ito, Numazu (JP); Taro Ishifune, Mishima (JP); Koji Nihonyanagi, Susono (JP); Jun Asami, Susono (JP); Keigo Akiya, Mishima (JP); Ryo Iwasawa, Yokohama (JP); Jun Agata, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 226 days.

(21) Appl. No.: 13/307,981

(22) Filed: Nov. 30, 2011

(65) Prior Publication Data

US 2012/0147395 A1 Jun. 14, 2012

(30) Foreign Application Priority Data

Dec. 9, 2010 (JP) ................................. 2010-275141
Sep. 14, 2011 (JP) ................................. 2011-200625

(51) Int. Cl.
*G06K 15/00* (2006.01)
*G03G 15/00* (2006.01)

(52) U.S. Cl.
CPC ........ *G03G 15/5062* (2013.01); *G03G 15/6561* (2013.01); *G03G 15/6567* (2013.01); *B65H 2301/4452* (2013.01); *B65H 2301/44522* (2013.01); *B65H 2511/13* (2013.01); *B65H 2515/112* (2013.01); *G03G 15/5029* (2013.01); *G03G 2215/00721* (2013.01); *G03G 2215/00738* (2013.01); *G03G 2215/00742* (2013.01); *G03G 2215/00751* (2013.01); *G03G 2215/00755* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,211,387 | A * | 5/1993 | Lloyd et al. | 271/111 |
| 7,130,553 | B2 * | 10/2006 | Sakai | 399/68 |
| 2006/0269307 | A1 * | 11/2006 | Funabiki et al. | 399/45 |
| 2007/0059001 | A1 * | 3/2007 | Matsuura et al. | 399/45 |
| 2008/0143045 | A1 * | 6/2008 | Yu et al. | 271/245 |
| 2009/0162090 | A1 * | 6/2009 | Shimada | 399/82 |
| 2009/0256308 | A1 * | 10/2009 | Kazama et al. | 271/226 |

FOREIGN PATENT DOCUMENTS

| | | | |
|---|---|---|---|
| CN | 101464644 | A | 6/2009 |
| CN | 101566814 | A | 10/2009 |
| CN | 101206425 | B | 10/2010 |
| JP | 9-134106 | A | 5/1997 |
| JP | 2001-305931 | A | 11/2001 |

(Continued)

OTHER PUBLICATIONS

JPO Machine Translation of JP2006-062797.*

*Primary Examiner* — Richard Zhu
(74) *Attorney, Agent, or Firm* — Canon USA, Inc. IP Division

(57) ABSTRACT

A sheet interval, serving as the distance between conveyed recording materials, is properly controlled based on a kind of a recording material and any one of a printing ratio, an adhesion amount of toner, and the presence or absence of graphic data, thus allowing printing at throughput suitable for, for example, the kind of the recording material and the printing ratio without changing an image forming condition such that image quality does not vary.

8 Claims, 14 Drawing Sheets

(56) References Cited

FOREIGN PATENT DOCUMENTS

JP 2006062797 A * 3/2006
JP 2008-116882 A 5/2008
JP 2009-8778 A 1/2009
JP 2009-151087 A 7/2009

* cited by examiner

IMAGE FORMING APPARATUS

BACKGROUND OF THE INVENTION

1. Field of the Invention

The present invention relates to an image forming apparatus that forms an image by developing a latent image, transferring the developed image to a recording material, and fixing the transferred image.

2. Description of the Related Art

It has recently been desired that the number of printing per unit time in an image forming apparatus be increased to increase productivity (throughput). Japanese Patent Laid-Open No. 2009-8778 discloses a method of optimally controlling a developing condition, a transferring condition, a conveying condition, and a fixing condition for image formation on the basis of a printing ratio of an image and a kind of a recording material in order to increase throughput of an image forming apparatus, thus preventing a reduction of the throughput.

According to this method disclosed in Japanese Patent Laid-Open No. 2009-8778, since image forming conditions are changed depending on the kind of the recording material and the printing ratio, if a fixing temperature is changed during printing based on a single job including a plurality of pages, the quantity of heat applied to a single recording material may vary in a page which is being subjected to printing just after the temperature is changed. Specifically, since the quantity of heat applied to a leading end of each recording material differs from that applied to a trailing end thereof, for example, the gloss of each recording material may be uneven, namely, such printed products may vary in finished quality. Disadvantageously, the printed products with different finished qualities may be produced irrespective of the same job.

SUMMARY OF THE INVENTION

According to an aspect of the present invention, an image forming apparatus includes a forming unit configured to form an image on a recording material, a receiving unit configured to receive information regarding a kind of the recording material, a conveying unit configured to convey the recording material, and a control unit configured to, when the forming unit successively forms images on a plurality of recording materials, control a sheet interval, serving as a distance between a trailing edge of a preceding recording material and a leading edge of a succeeding recording material conveyed through the conveying unit, based on received information regarding the kind of the recording material without changing an image forming condition of the forming unit.

Further features of the present invention will become apparent from the following description of exemplary embodiments with reference to the attached drawings.

DESCRIPTION OF THE EMBODIMENTS

Exemplary embodiments of the present invention will be described below with reference to the drawings. The following embodiments are not intended to restrict the present invention described in the appended claims. All of the combinations of features described in the embodiments are not necessary for solving problems in accordance with an embodiment of the present invention.

First Embodiment

Figure 1:
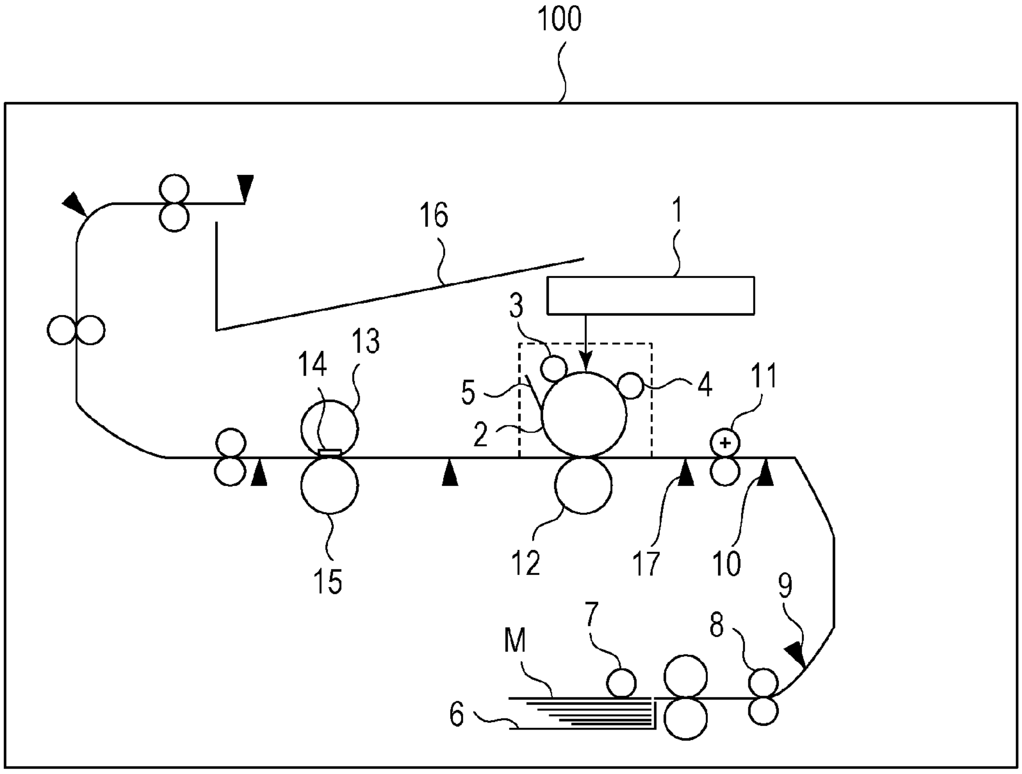
FIG. 1 is a schematic diagram illustrating a configuration of an image forming apparatus.

FIG. 1 is a schematic diagram illustrating a configuration of an image forming apparatus according to a first embodiment. Recording materials M stacked on a sheet feed cassette 6 are fed by a sheet feed roller 7. Each recording material M fed from the sheet feed cassette 6 is conveyed by conveying rollers 8. While a conveyance state of the recording material M is detected by a conveyance sensor 9, the recording material M is conveyed to registration rollers 11. When the leading edge of the recording material M reaches a conveyance sensor 10 which is disposed upstream of the registration rollers 11 and is the closest to the registration rollers 11, an electromagnetic clutch (not illustrated) that controls rotation of the registration rollers 11 is turned off, so that the rotation of the registration rollers 11 is stopped. When the recording material M is conveyed to the registration rollers 11, a medium sensor 17 detects a kind of the recording material M.

When the recording material M reaches the registration rollers 11, a forming unit forms an image. The forming unit includes a photosensitive drum 2, a charging roller 3, a developing roller 4, and a cleaning blade 5. A laser optical system 1 is allowed to emit a laser beam to the photosensitive drum 2 charged by the charging roller 3 on the basis of image information supplied to a controller of the image forming apparatus, indicated at 100. The laser beam is allowed to scan the photosensitive drum 2 which is rotating, thus forming a latent image. The formed latent image is developed as a toner image by the developing roller 4. The recording material M is again conveyed such that the toner image formed on the photosensitive drum 2 is transferred onto the recording material M by a transfer roller 12. The photosensitive drum 2, from which the toner image has been transferred, is cleaned by the cleaning blade 5.

The recording material M with the transferred toner image is conveyed to a fixing unit. The fixing unit is an on-demand fixing device including a fixing film 13, a heater 14, and a pressure roller 15. The fixing unit fixes the toner image to the recording material M and the resultant recording material M is then discharged to a sheet output tray 16.

Figure 2:
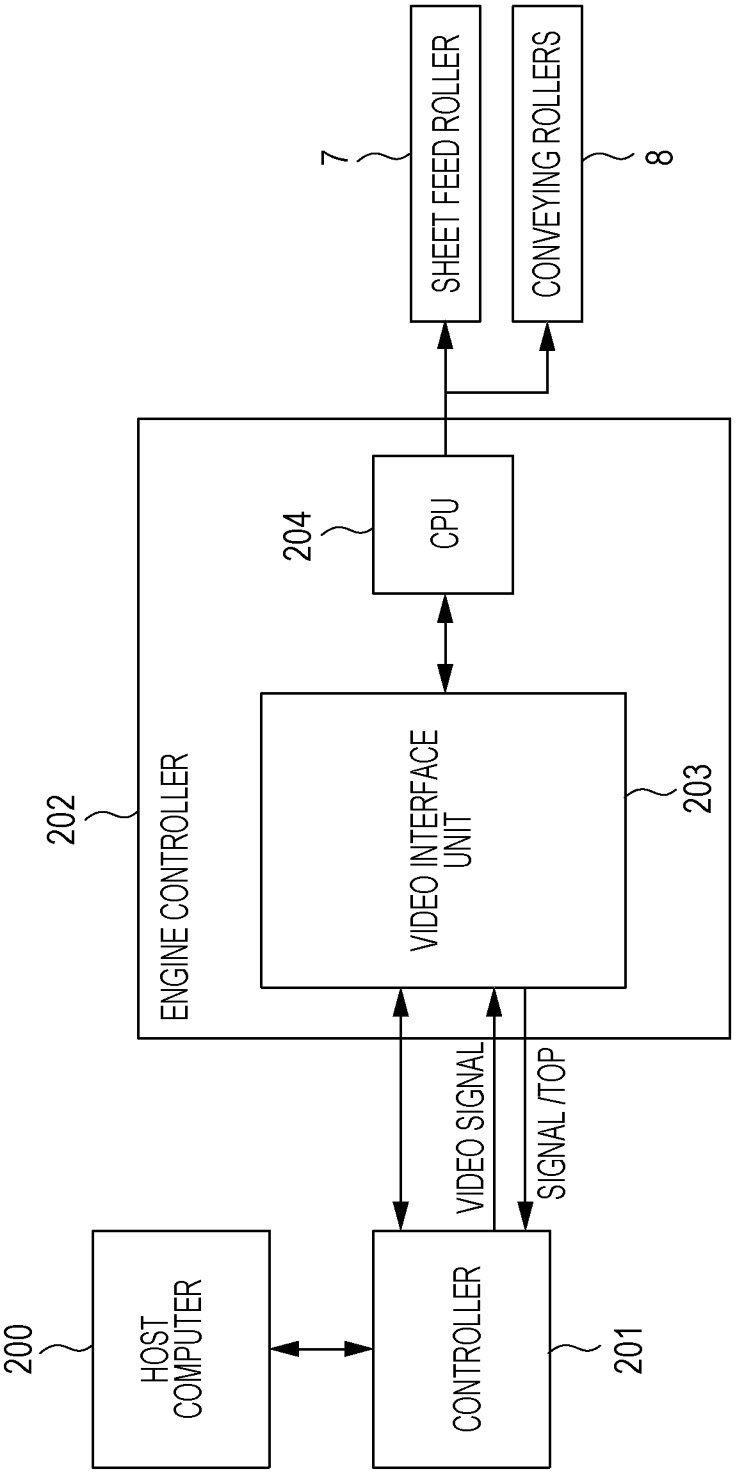
FIG. 2 is a block diagram illustrating an engine controller of the image forming apparatus.

FIG. 2 is a block diagram illustrating an engine controller of the image forming apparatus 100. A host computer 200 transmits image information and a print instruction to the controller. The controller, indicated at 201, analyzes the image information received from the host computer 200 and transmits the information to a video interface unit 203. The controller 201 can communicate with the host computer 200 and the engine controller, indicated at 202. The controller 201 transmits a print reservation command for each recording material, a print start command, and a video signal to the engine controller 202 through the video interface unit 203.

When receiving the print reservation commands from the controller 201 through the video interface unit 203, the engine controller 202 controls a CPU 204 to prepare for printing in order of the print reservation commands and waits for the print start command to arrive. When receiving the print start command, the engine controller 202 outputs a signal /TOP indicating reference time to output a video signal to the controller 201 and starts a printing operation in accordance with the print reservation commands. Upon printing, the CPU 204 controls the time to drive the sheet feed roller 7 and the time to drive the conveying rollers 8 on the basis of a kind of a recording material and a value related to a printing ratio. The value related to the printing ratio may be, for example, the printing ratio itself, a value related to the number of toner dots to be transferred onto the recording material M, or a value related to the number of toner dots per unit area. For example, if a value related to the number of toner dots to be transferred onto the recording material M is received, a table illustrating the relationship between the size of the recording material M and the number of dots may be used and the value may be used instead of the printing ratio. If a value related to the number of toner dots per unit area is received, a plurality of values related to the numbers of toner dots per unit area may be averaged and the average may be used instead of the printing ratio. As described above, a value corresponding to the printing ratio or a value correlated to the printing ratio may be obtained as a value related to the printing ratio. In the following description, for the sake of convenience, it is assumed that a value related to a printing ratio is the printing ratio itself. Accordingly, a printing ratio in the following description may be replaced with a value related to the printing ratio. In this specification, the term "printing ratio" indicating the amount of toner is defined as the area of a region where toner is to be transferred divided by the area of the entire image forming region (hereinafter, referred to as "(the area of a region where toner is to be transferred)/(the area of the entire image forming region)").

Figure 3:
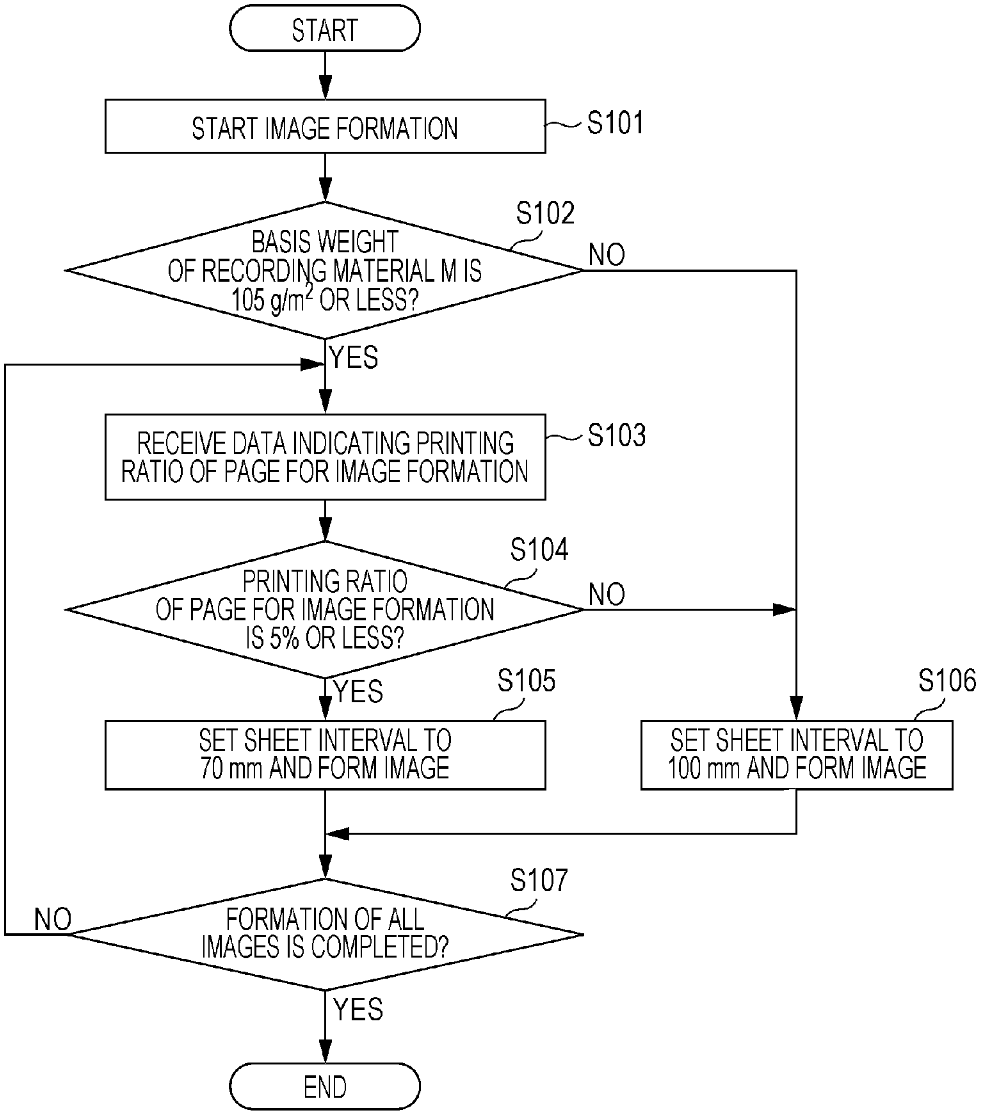
FIG. 3 is a flowchart illustrating a method of controlling a sheet interval, serving as a distance between conveyed recording materials, based on a kind of a recording material and a printing ratio.

FIG. 3 is a flowchart illustrating a method of controlling an interval between sheets (hereinafter, "sheet interval"), i.e., a distance between conveyed recording materials on the basis of a kind of a recording material and a printing ratio. In this case, if a value related to the printing ratio is used as the printing ratio as described above, control can be similarly performed. In S101, the CPU 204 starts image formation. In S102, the CPU 204 receives information regarding a kind of the recording material M designated by a user or detected by the medium sensor 17, and determines, based on the information regarding the kind of the recording material M, whether a basis weight of the recording material M is less than or equal to 105 g/m$^2$. If the basis weight of the recording material M is not less than or equal to 105 g/m$^2$, the CPU 204 sets the sheet interval to 100 mm and allows image formation in S106. At this time, assuming that the conveying speed of the recording material M is 310 mm/s, a throughput of 60 ppm can be achieved in feeding A4 sheets in landscape orientation. If the basis weight of the recording material M is less than or equal to 105 g/m$^2$, the CPU 204 receives data indicating a printing ratio from the controller 201 in S103.

In S104, the CPU 204 determines whether the printing ratio is less than or equal to 5%. If the printing ratio is less than or equal to 5%, the CPU 204 sets the sheet interval to 70 mm and allows image formation in S105. At this time, assuming that the conveying speed of the recording material M is 310 mm/s, a throughput of 66 ppm can be achieved in feeding A4 sheets in landscape orientation. If the printing ratio is not less than or equal to 5%, the CPU 204 sets the sheet interval to 100 mm and allows image formation in S106. In S107, the CPU 204 determines whether formation of all images included in a job is completed.

In this specification, the sheet interval is defined as a distance between a leading edge of a recording material M1 and a trailing edge of a recording material M0 which is conveyed so as to precede the recording material M1 and which has been subjected to printing before the recording material M1 during conveyance of the recording materials M through the registration rollers 11 to the nip between the photosensitive drum 2 and the transfer roller 12. In other words, the sheet interval is the distance between the trailing edge of the preceding recording material and the leading edge of the succeeding recording material. The above-described sheet interval of 70 mm or 100 mm is an example in the configuration in the present embodiment and may be appropriately changed as, for example, the melting point of toner, the capacity of a power supply for heating the fixing device, or the structure of the pressure roller varies. Furthermore, a threshold value for determination of the recording material M and a threshold value for determination of the printing ratio are examples in the configuration in the present embodiment and may be appropriately changed as, for example, the melting point of toner, the capacity of the power supply for heating the fixing device, or the structure of the pressure roller varies.

As described above, when text with a low printing ratio is printed to a recording material, such as thin paper having a basis weight of 80 g/m$^2$ or less or plain paper having a basis weight of 105 g/m$^2$ or less, assumed to be used in an office or similar locations, the quantity of heat lost upon fixing a toner image to the recording material through the fixing device is reduced. Accordingly, the fixing device can be controlled at a temperature for fixing the next recording material in short time. If the sheet interval is reduced, therefore, the fixability of a toner image to the recording material can be kept. Consequently, reducing the sheet interval can improve throughput. As regards successive printing on a plurality of recording materials, therefore, printing can be performed at throughput suitable for a kind of a recording material and a printing ratio without changing an image forming condition such that image quality does not vary. The above-described thin paper and plain paper are examples in the present embodiment. If a condition of the image forming apparatus varies, for example, the melting point of toner, the capacity of the power supply for heating the fixing device, or the structure of the pressure roller varies, appropriate recording materials can be set.

The above-described flowchart of FIG. 3 has been described with respect to the use of a single threshold value for the printing ratio. A plurality of threshold values may be used. A flowchart of FIG. 4 relates to a case where two threshold values for a printing ratio are used. The same steps as those in the above-described flowchart of FIG. 3 are designated by the same reference numerals and description thereof is omitted. In this case, if a value related to the printing ratio is used as the printing ratio as described above, control can be similarly performed.

In S201, the CPU 204 determines based on the received data whether the printing ratio is less than or equal to 10%. If the printing ratio is not less than or equal to 10%, the CPU 204 sets the sheet interval to 100 mm and allows image formation in S106. If the printing ratio is less than or equal to 10%, the CPU 204 determines in S202 whether the printing ratio is less than or equal to 5%. If the printing ratio is less than or equal to 5%, the CPU 204 sets the sheet interval to 70 mm and allows image formation in S203. At this time, assuming that the conveying speed of the recording material M is 310 mm/s, a throughput of 66 ppm can be achieved in feeding A4 sheets in landscape orientation. If the printing ratio is not less than or equal to 5%, the CPU 204 sets the sheet interval to 85 mm and allows image formation in S204. At this time, assuming that the conveying speed of the recording material is 310 mm/s, a throughput of 63 ppm can be achieved in feeding A4 sheets in landscape orientation. Assuming that images are formed on the recording materials M having the same basis weight, the quantity of heat lost upon fixing a toner image to the recording material M through the fixing device in image formation at a low printing ratio (for example, 5% in this embodiment) is smaller than that at a high printing ratio (for example, 10% in this embodiment). Accordingly, the time required to control the fixing device at a target temperature in the case where the printing ratio is low is shorter than that in the case where the printing ratio is high. Thus, the sheet interval can be reduced.

Figure 4:
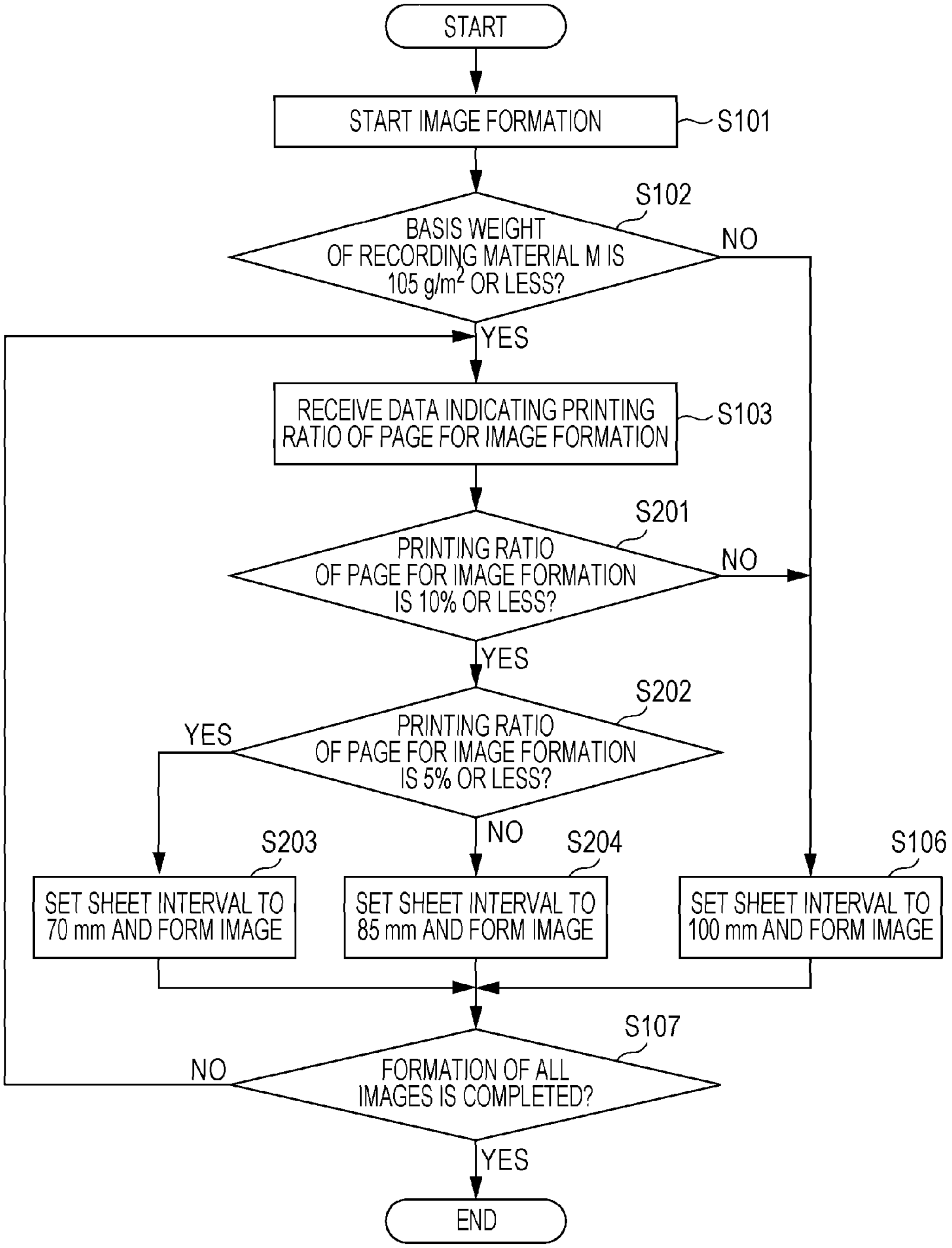
FIG. 4 is a flowchart illustrating a method of controlling a sheet interval using two threshold values for a printing ratio.
Figure 14:
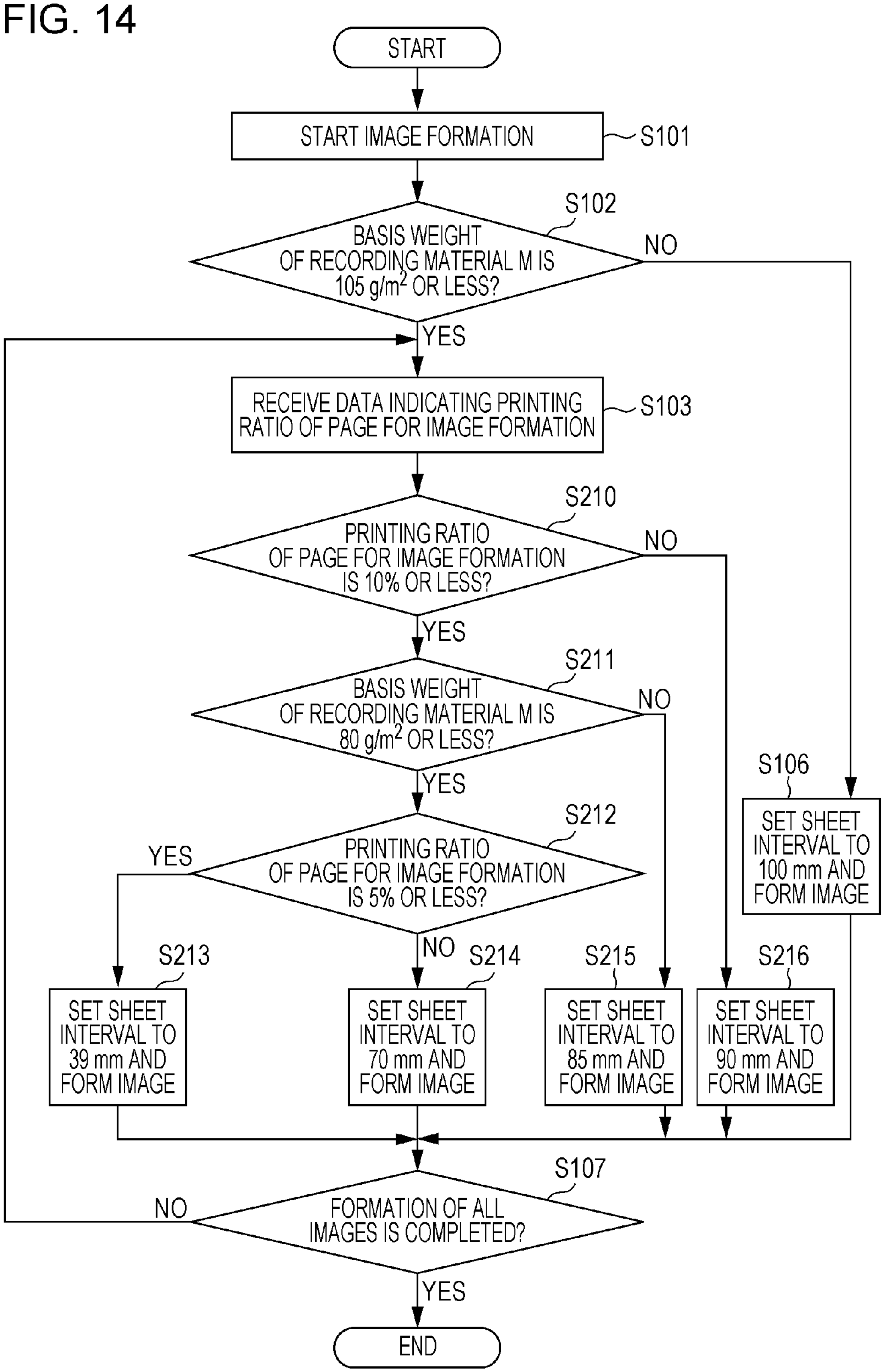
FIG. 14 is a flowchart illustrating a method of controlling a sheet interval using two threshold values for a printing ratio and two threshold values for a basis weight of a recording material.

The above-described flowchart of FIG. 4 has been described with respect to the use of two threshold values for the printing ratio. Furthermore, two threshold values for a basis weight of the recording material M may be used. A flowchart of FIG. 14 relates to a case where two threshold values for a printing ratio and two threshold values for the basis weight of the recording material M are used. The same steps as those in FIGS. 3 and 4 are designated by the same reference numerals and description thereof is omitted. In this case, if a value related to the printing ratio is used as the printing ratio as described above, control can be similarly performed.

In S210, the CPU 204 determines based on received data whether the printing ratio is less than or equal to 10%. If the printing ratio is not less than or equal to 10%, the CPU 204 sets the sheet interval to 90 mm and allows image formation in S216. The reason why the sheet interval in the case where the printing ratio is greater than 10% can be set shorter than that in the case where the basis weight of the recording material M is greater than 105 $g/m^2$ is as follows. When the quantity of heat lost upon fixing a toner image to the recording material M in the case where the basis weight of the recording material M is greater than 105 $g/m^2$ is compared with that in the case where the basis weight of the recording material M is less than or equal to 105 $g/m^2$ and the printing ratio is greater than 10%, the quantity of heat lost in the latter case is smaller than that in the former case.

If the printing ratio is less than or equal to 10%, the CPU 204 determines in S211 whether the basis weight of the recording material M is less than or equal to 80 $g/m^2$. If the basis weight of the recording material M is not less than or equal to 80 $g/m^2$, the CPU 204 sets the sheet interval to 85 mm and allows image formation in S215. If the basis weight of the recording material M is less than or equal to 80 $g/m^2$, the CPU 204 determines based on the received data in S212 whether the printing ratio is less than or equal to 5%. If the printing ratio is not less than or equal to 5%, the CPU 204 sets the sheet interval to 70 mm and allows image formation in S214. If the printing ratio is less than or equal to 5%, the CPU 204 sets the sheet interval to 39 mm and allows image formation in S213. At this time, assuming that the conveying speed of the recording material M is 310 mm/s, a throughput of 63 ppm can be achieved in feeding A4 sheets in landscape orientation.

The control method using the printing ratio has been described above as an example. The criterion is not limited to the printing ratio. The amount of toner itself may be obtained by, for example, pixel counting and the obtained amount can be compared with a threshold value.

As described above, in the case where a plurality of threshold values for the printing ratio are used, a further detailed throughput based on the printing ratio can be achieved. Consequently, while the sheet interval is properly controlled without changing an image forming condition, printing can be performed at throughput suitable for the kind of the recording material and the printing ratio such that image quality does not vary in a single recording material. The above-described sheet intervals are examples in the configuration in the present embodiment. The sheet interval may be appropriately changed as, for example, the melting point of toner, the capacity of the power supply for heating the fixing device, or the structure of the pressure roller varies. Moreover, the above-described threshold values used to determine the kind of the recording material M and the threshold values used to determine the printing ratio are examples in the configuration in the present embodiment. The threshold values can be appropriately changed as, for example, the melting point of toner, the capacity of the power supply for heating the fixing device, or the structure of the pressure roller varies.

Second Embodiment

The first embodiment has been described with respect to the methods of controlling a sheet interval on the basis of a kind of the recording material M for image formation and a printing ratio to form an image at appropriate throughput. A second embodiment will be described with respect to a method of controlling a sheet interval on the basis of a previous image forming state in addition to a kind of the recording material M on which an image is to be formed and a printing ratio. Description of the same components of an image forming apparatus according to the second embodiment as those in the first embodiment is omitted herein.

Figure 5:
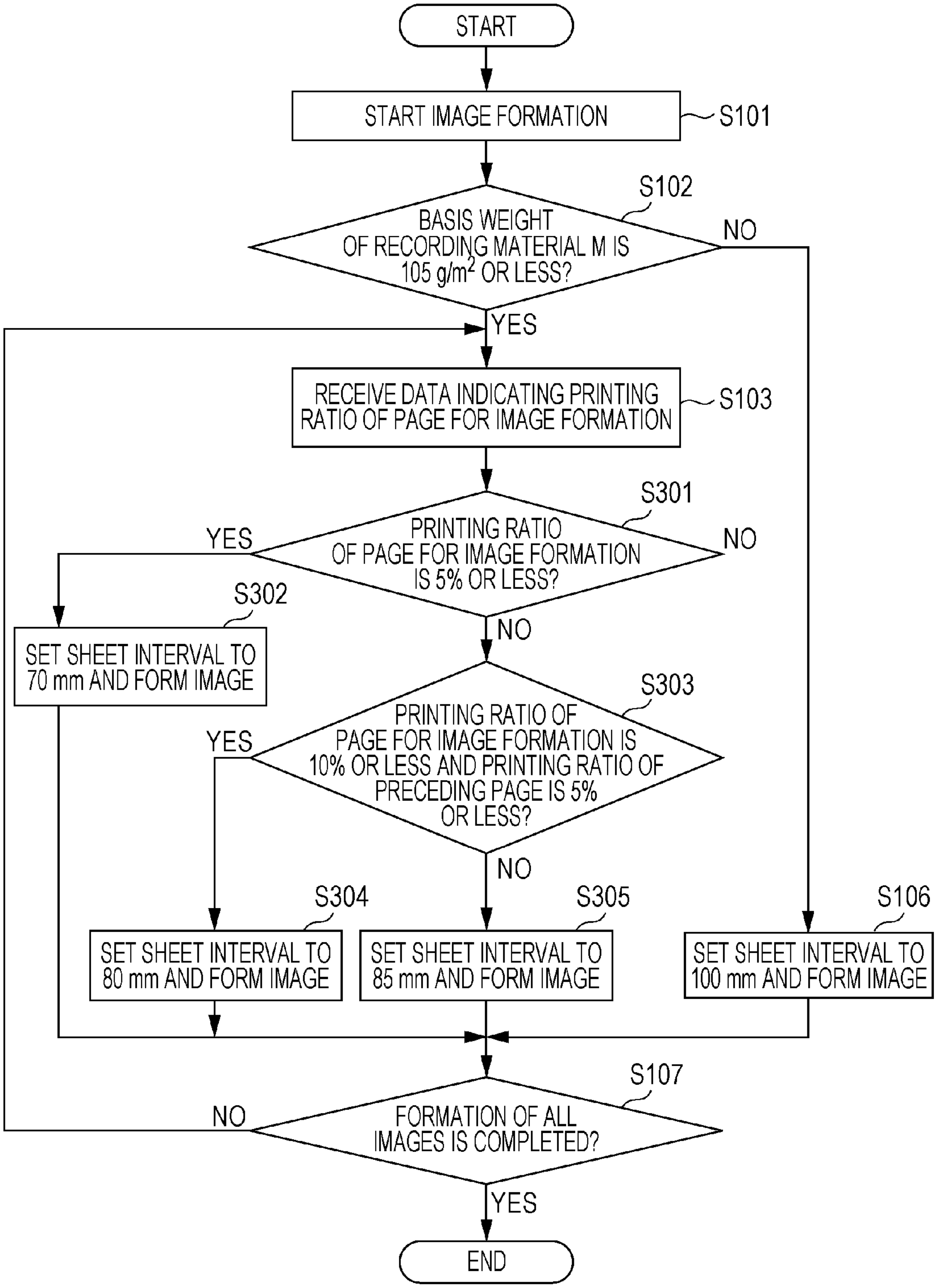
FIG. 5 is a flowchart illustrating a method of controlling a sheet interval on the basis of a kind of a recording material on which an image is to be formed (hereinafter, also referred to as a "recording material for image formation"), a printing ratio, and a printing ratio of the preceding page.

FIG. 5 is a flowchart illustrating a method of controlling a sheet interval, serving as a distance between conveyed recording materials, based on a kind of the recording material M for image formation, a printing ratio, and a printing ratio of the preceding page. The same steps as those in the above-described flowchart of FIG. 3 are designated by the same reference numerals and description thereof is omitted. In this case, if a value related to the printing ratio is used as the printing ratio as described above, control can be similarly performed.

In S301, the CPU 204 determines based on received data whether the printing ratio is less than or equal to 5%. If the printing ratio is less than or equal to 5%, the CPU 204 sets the sheet interval to 70 mm and allows image formation in S302. If the printing ratio is not less than or equal to 5%, the CPU 204 determines in S303 whether the printing ratio is less than or equal to 10% and the printing ratio of the preceding page is less than or equal to 5%. If the printing ratio is less than or equal to 10% and the printing ratio of the preceding page is less than or equal to 5%, the CPU 204 sets the sheet interval to 80 mm and allows image formation in S304. In this case, assuming that the conveying speed of the recording material M is 310 mm/s, a throughput of 64 ppm can be achieved in feeding A4 sheets in landscape orientation. If the printing ratio is less than or equal to 10% and the printing ratio of the preceding page is not less than or equal to 5%, the CPU 204 sets the sheet interval to 85 mm and allows image formation in S305. In this case, assuming that the conveying speed of the recording material M is 310 mm/s, a throughput of 63 ppm can be achieved in feeding A4 sheets in landscape orientation.

Figure 6:
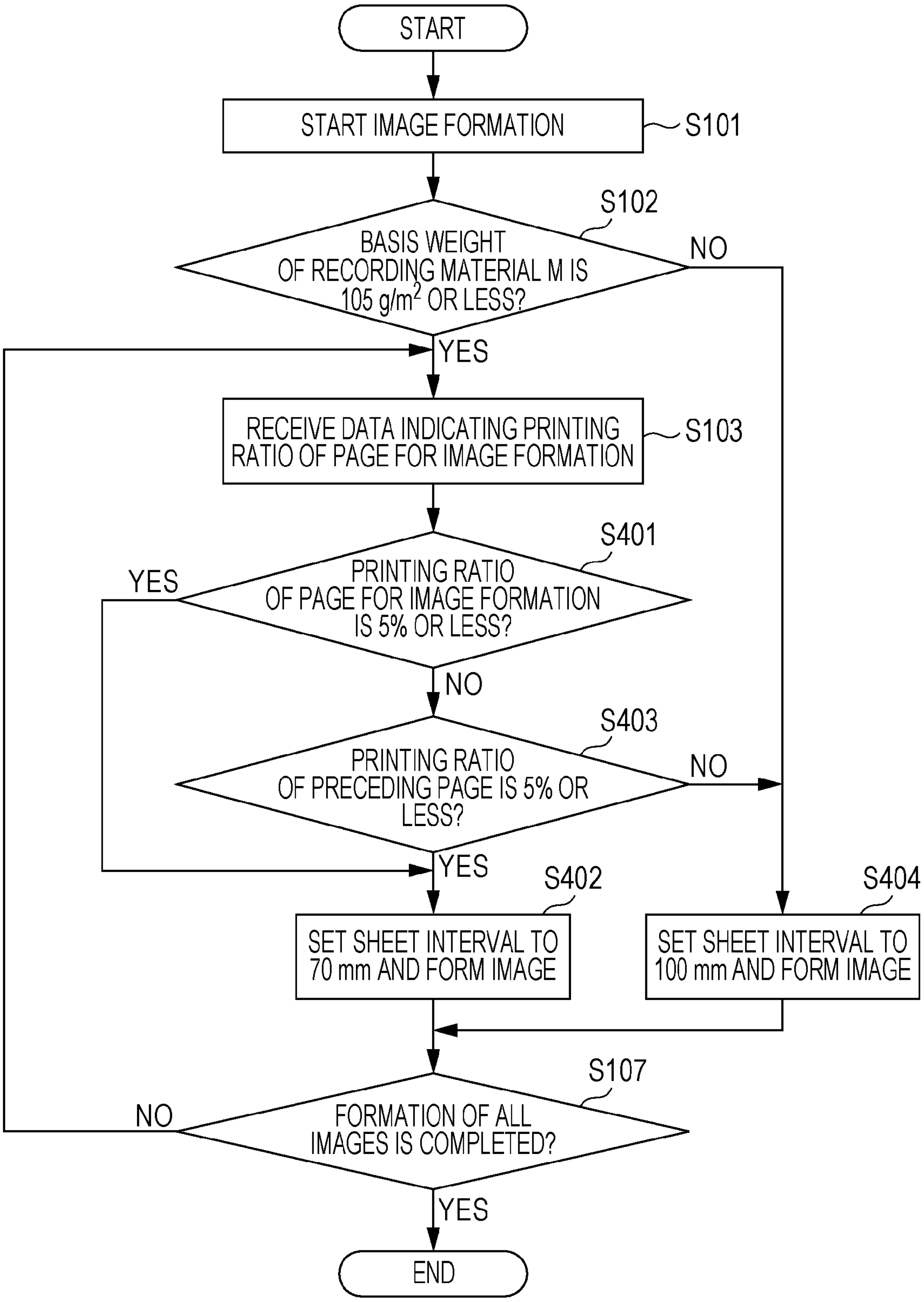
FIG. 6 is a flowchart illustrating a method of controlling a sheet interval to successively form images each having a high printing ratio.

Furthermore, as a method of controlling a sheet interval on the basis of the printing ratio of the preceding page, there is a method of increasing a sheet interval upon successive high-printing-ratio image formation. FIG. 6 is a flowchart illustrating setting of a sheet interval upon successive high-printing-ratio image formation. The same steps as those in the above-described flowchart of FIG. 3 are designated by the same reference numerals and description thereof is omitted. In this case, if a value related to the printing ratio is used as the printing ratio as described above, control can be similarly performed.

In S401, the CPU 204 determines based on received data whether the printing ratio is less than or equal to 5%. If the printing ratio is less than or equal to 5%, the CPU 204 sets the sheet interval to 70 mm and allows image formation in S402. If the printing ratio is not less than or equal to 5%, the CPU 204 determines in S403 whether the printing ratio of the preceding page is less than or equal to 5%. If the printing ratio of the preceding page is less than or equal to 5%, the CPU 204 sets the sheet interval to 70 mm and allows image formation in S402. If the printing ratio of the preceding page is not less than or equal to 5%, the CPU 204 sets the sheet interval to 100 mm and allows image formation in S404.

As described above, the sheet interval is controlled based on the previous image forming state in addition to the kind of the recording material M on which an image is to be formed and the printing ratio. Consequently, while the sheet interval is appropriately controlled without changing an image forming condition, printing can be performed at throughput suitable for the kind of the recording material and the printing ratio such that image quality does not vary in a single recording material. The above-described sheet intervals are examples in a configuration in the present embodiment and may be appropriately changed as, for example, the melting point of toner, the capacity of the power supply for heating the fixing device, or the structure of the pressure roller varies. Furthermore, the threshold value for determination of the kind of the recording material M and the threshold values for determination of the printing ratio are examples in the configuration in the present embodiment and may be appropriately changed as, for example, the melting point of toner, the capacity of the power supply for heating the fixing device, or the structure of the pressure roller varies.

Third Embodiment

The first and second embodiments have been described with respect to the methods of setting a sheet interval on the basis of a kind of the recording material M for image formation and a printing ratio and the methods of setting a sheet interval on the basis of a printing ratio of the preceding page in addition to the kind of the recording material M for image formation and the printing ratio. A third embodiment will be described with respect to an image forming apparatus that further includes a registration shutter provided for the registration rollers 11 to offer improved throughput. Description of the same components of the image forming apparatus as those in the first embodiment is omitted herein.

Figure 7:
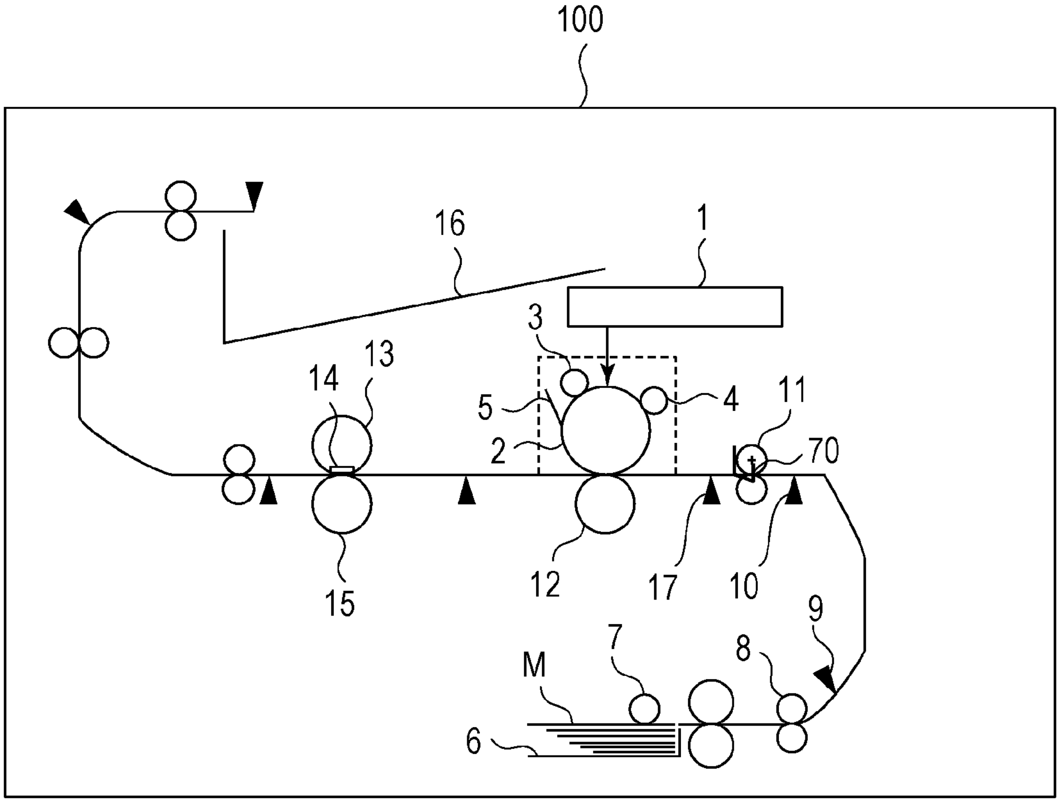
FIG. 7 is a schematic diagram illustrating a configuration of an image forming apparatus including a registration shutter.

FIG. 7 is a schematic diagram illustrating a configuration of the image forming apparatus according to the present embodiment. The same components as those of the image forming apparatus in FIG. 1 are designated by the same reference numerals and description thereof is omitted herein. The image forming apparatus according to the present embodiment differs from that in FIG. 1 in that the registration rollers 11 are provided with a registration shutter 70 rotating about the same axis as that of one of the registration rollers 11 such that the registration shutter 70 is rotatably supported. A sheet interval can be controlled using the registration shutter 70 without stopping the recording material M before the leading edge of the recording material M reaches the registration rollers 11.

Figure 8A:
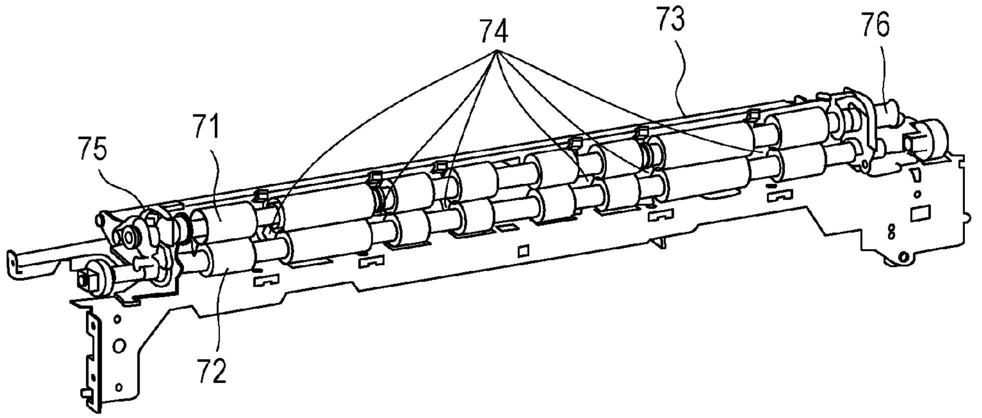
FIGS. 8A and 8B are perspective views of the registration shutter.
Figure 8B:
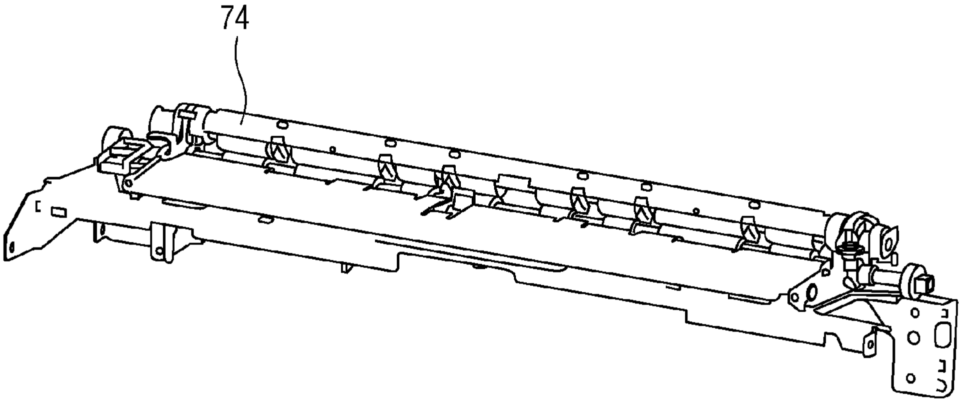

FIG. 8A is a perspective view of the registration shutter when viewed from the upstream side of the recording material in the conveying direction in which the recording material is conveyed. FIG. 8B is a perspective view of the registration shutter when viewed from the downstream side in the conveying direction. The registration rollers 11 include a registration driven roller 71 and a registration driving roller 72 such that the registration driven roller 71 is disposed on the upper side of the registration driven roller 71 in the vertical direction. The registration shutter 70 includes a sheet metal stay 73 and recording material guides 74 of resin such that the stay 73 is integrated with the recording material guides 74. The recording material guides 74, which are six, are arranged in the width direction of the registration shutter 70 orthogonal to the conveying direction of the recording material M. The registration shutter 70 is rotatably supported by bearings 75 and 76 on the left and right sides of the registration driven roller 71. A torsion coil spring (not illustrated) applies force to the registration shutter 70 such that the registration shutter 70 presses against the leading edge of the recording material M in the opposite direction from the conveying direction of the recording material M.

Figure 9A:
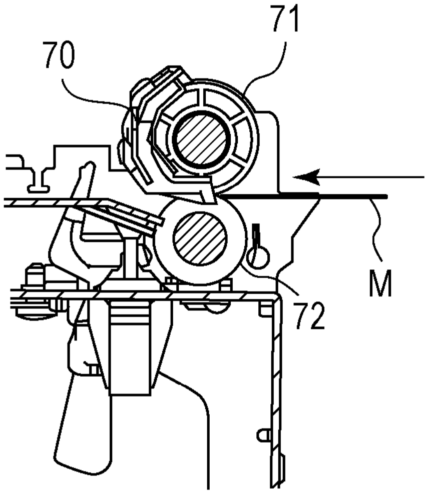
FIGS. 9A to 9C are diagrams illustrating an operation of the registration shutter during conveyance of a recording material.
Figure 9B:
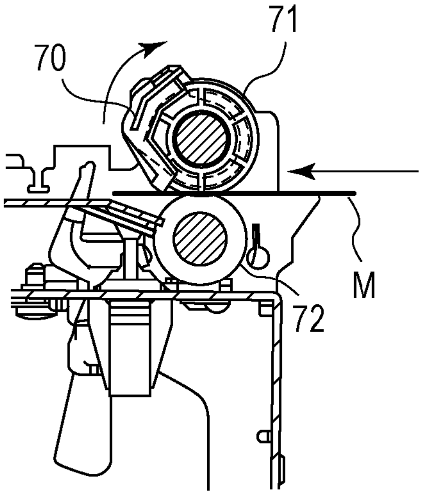
Figure 9C:
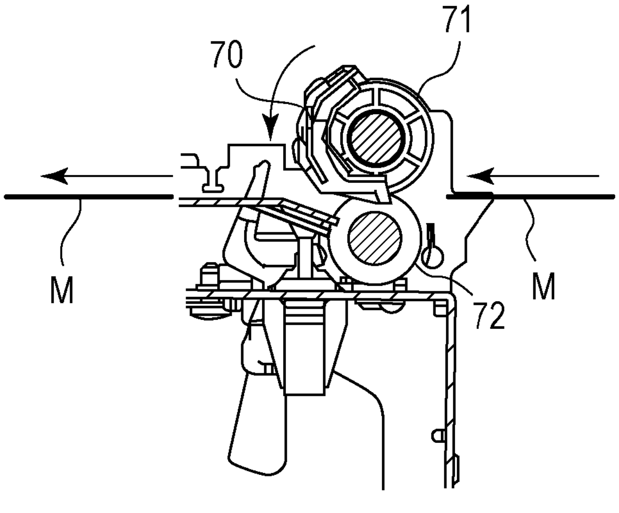

FIGS. 9A to 9C illustrate an operation of the registration shutter 70 when the recording material M is conveyed thereto. Referring to FIG. 9A, the leading edge of the conveyed recording material M comes into contact with the registration shutter 70. Referring to FIG. 9B, the registration shutter 70 corrects skew of the recording material M. Referring to FIG. 9C, after the trailing edge of the recording material M passes through the registration rollers 11, a driving force is applied from the torsion coil spring (not illustrated) to the registration shutter 70, so that the registration shutter 70 rotates and returns to its initial position. As described above, in the use of the registration shutter 70, skew of the recording material M can be corrected without stopping the recording material M at the registration rollers 11.

The time which it takes for the registration shutter 70 to switch from a state illustrated in FIG. 9B to a state illustrated in FIG. 9C is about 100 ms. On the other hand, the time which it takes to temporarily stop the rotation of the registration rollers 11, correct skew of the recording material M, and again drive the registration rollers 11 is about 200 ms. Since the time required to correct skew of the recording material M corresponds to the difference between the above-described times, 100 ms, when it is assumed that the conveying speed is 310 mm/s, the sheet interval can be set to 39 mm that is reduced from 70 mm by 31 mm.

Figure 10:
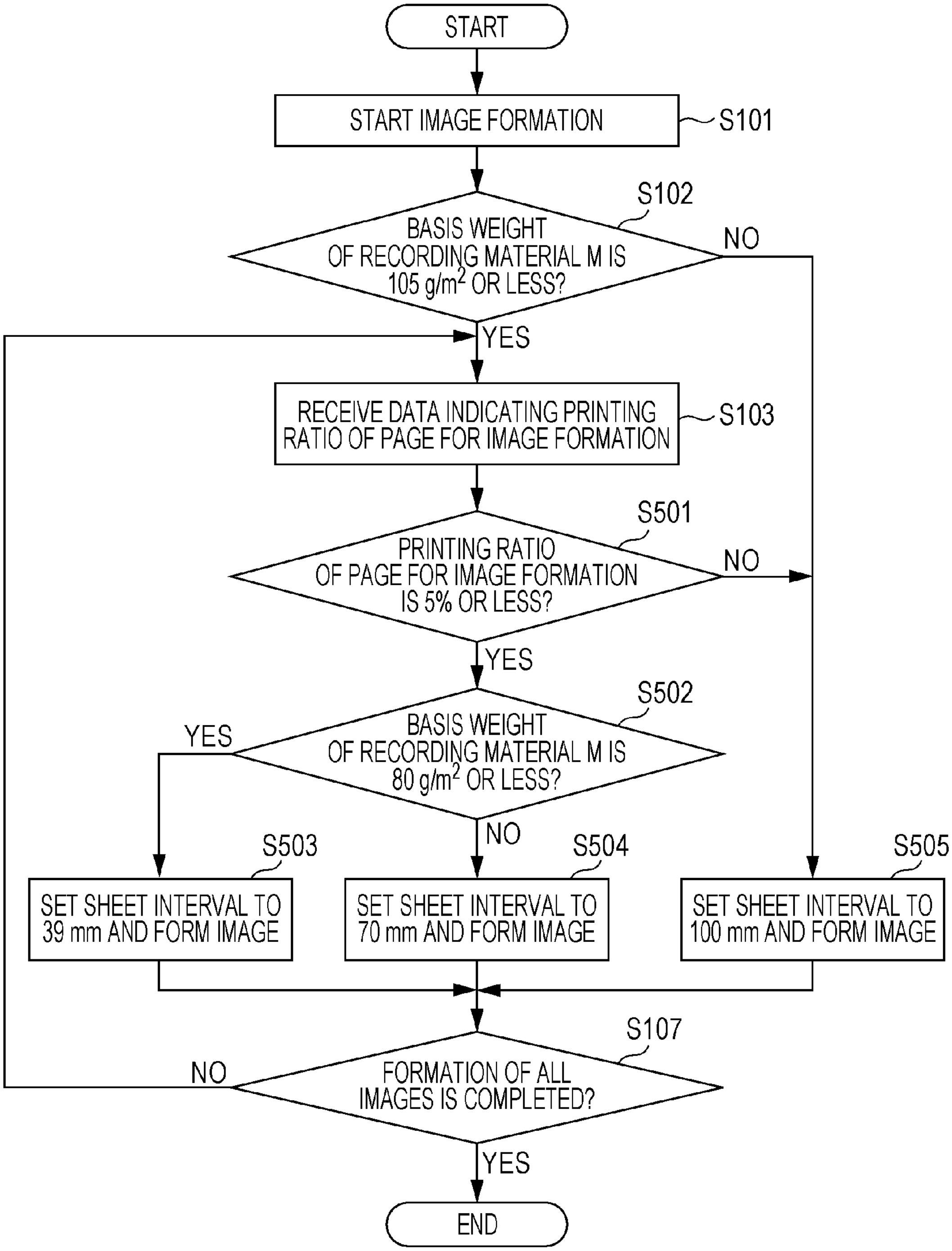
FIG. 10 is a flowchart illustrating a method of controlling a sheet interval in the image forming apparatus including the registration shutter.

FIG. 10 is a flowchart illustrating a method of controlling a sheet interval in the use of the registration shutter 70. The same steps as those in the above-described flowchart of FIG.

3 are designated by the same reference numerals and description thereof is omitted. In this case, if a value related to a printing ratio is used as the printing ratio as described above, control can be similarly performed. In S501, the CPU 204 determines based on received data whether the printing ratio is less than or equal to 5%. If the printing ratio is not less than or equal to 5%, the CPU 204 sets the sheet interval to 100 mm and allows image formation in S505. If the printing ratio is less than or equal to 5%, the CPU 204 determines in S502 whether the basis weight of the recording material M is less than or equal to 80 g/m$^2$. If the basis weight of the recording material M is less than or equal to 80 g/m$^2$, the CPU 204 sets the sheet interval to 39 mm and allows image formation in S503. The reason why the sheet interval can be set to 39 mm is as follows. Skew of the recording material M can be corrected without stopping the conveyance of the recording material M. Furthermore, since the recording material M is thin paper having a basis weight of 80 g/m$^2$ or less, the quantity of heat lost from the fixing device upon fixing a toner image to the recording material M is smaller than that to the recording material M which is plain paper having a basis weight that is greater than 80 g/m$^2$ and is less than or equal to 105 g/m$^2$. In this case, assuming that the conveying speed of the recording material M is 310 mm/s, a throughput of 74 ppm can be achieved in feeding A4 sheets in landscape orientation. If the basis weight of the recording material M is not less than or equal to 80 g/m$^2$, the CPU 204 sets the sheet interval to 70 mm and allows image formation in S504.

As described above, skew of the recording material M is corrected using the registration shutter 70, so that the sheet interval can be set shorter than that in the case where skew is corrected through the registration rollers 11. Consequently, while the sheet interval is properly controlled without changing an image forming condition, printing can be performed at throughput suitable for the kind of the recording material and the printing ratio such that image quality does not vary in a single recording material. The above-described sheet intervals are examples in the configuration in the present embodiment and may be appropriately changed as, for example, the melting point of toner, the capacity of the power supply for heating the fixing device, or the structure of the pressure roller varies. Furthermore, the above-described threshold values for determination of the kind of the recording material M and the threshold value for determination of the printing ratio are examples in the configuration in the present embodiment and may be appropriately changed as, for example, the melting point of toner, the capacity of the power supply for heating the fixing device, or the structure of the pressure roller varies.

Fourth Embodiment

The first to third embodiments have been described with respect to the methods of controlling a sheet interval on the basis of, for example, a kind of the recording material M for image formation and a printing ratio in the image forming apparatus for monochrome image formation. A fourth embodiment will be described with respect to a method of controlling a sheet interval in an image forming apparatus for color image formation.

Figure 11:
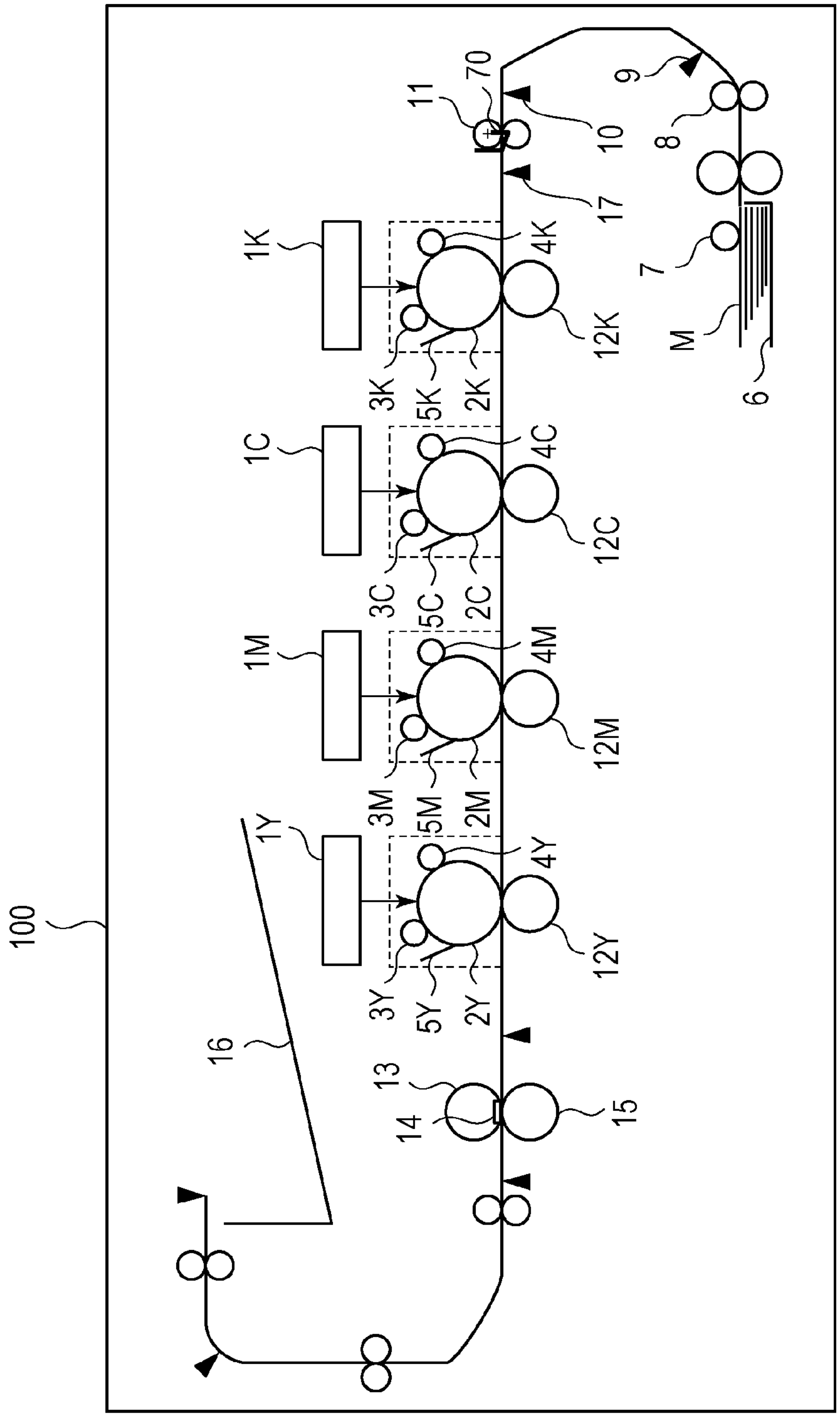
FIG. 11 is a schematic diagram illustrating a configuration of an image forming apparatus for color image formation.

FIG. 11 is a schematic diagram illustrating a configuration of the image forming apparatus for color image formation according to the present embodiment. The same components as those in the above-described image forming apparatus for monochrome image formation in FIG. 7 are designated by the same reference numerals and description thereof is omitted herein. The image forming apparatus according to the present embodiment differs from the image forming apparatus of FIG. 7 in that a plurality of forming units for image formation are arranged. The forming units include photosensitive drums 2 (2Y, 2M, 2C, and 2K), charging rollers 3 (3Y, 3M, 3C, and 3K), developing rollers 4 (4Y, 4M, 4C, and 4K), and cleaning blades 5 (5Y, 5M, 5C, and 5K), respectively. Laser optical systems 1 (1Y, 1M, 1C, and 1K) are allowed to emit a laser beam to the corresponding photosensitive drum 2 (2Y, 2M, 2C, or 2K) charged by the corresponding charging roller 3 (3Y, 3M, 3C, or 3K) on the basis of image information supplied to the controller 201 of the image forming apparatus 100. Each laser beam scans the corresponding photosensitive drum 2 (2Y, 2M, 2C, or 2K) which is rotating, thus forming a latent image. The formed latent image is developed as a toner image by the corresponding developing roller 4 (4Y, 4M, 4C, or 4K). The recording material M is again conveyed such that the toner images formed on the respective photosensitive drums 2 (2Y, 2M, 2C, and 2K) are transferred onto the recording material M by transfer rollers 12 (12Y, 12M, 12C, and 12K), thus forming a color image.

In the above-described first to third embodiments, since a monochrome image is formed, the printing ratio, serving as one of parameters for sheet interval control, is defined by (the area of a region where toner is to be transferred)/(the area of the entire image forming region). Accordingly, the printing ratio ranges from 0% to 100%. On the other hand, a color image is obtained by superimposition of four color toners. Accordingly, the amount of toner of a single-color image differs from that of a four-color image if the images are based on the same printing ratio. The present embodiment therefore uses an adhesion amount of toner as a parameter for sheet interval control. The adhesion amount is defined as the sum of the amounts of toners used to form different color images. In other words, the adhesion amount and (the area of a region where toner is to be transferred)/(the area of the entire image forming region) for each of the four colors of YMCK are obtained and the obtained values are summed up. Accordingly, the resultant value ranges from 0% to 400%. The amount of toner of each color used for image formation can be calculated based on image data.

Figure 12:
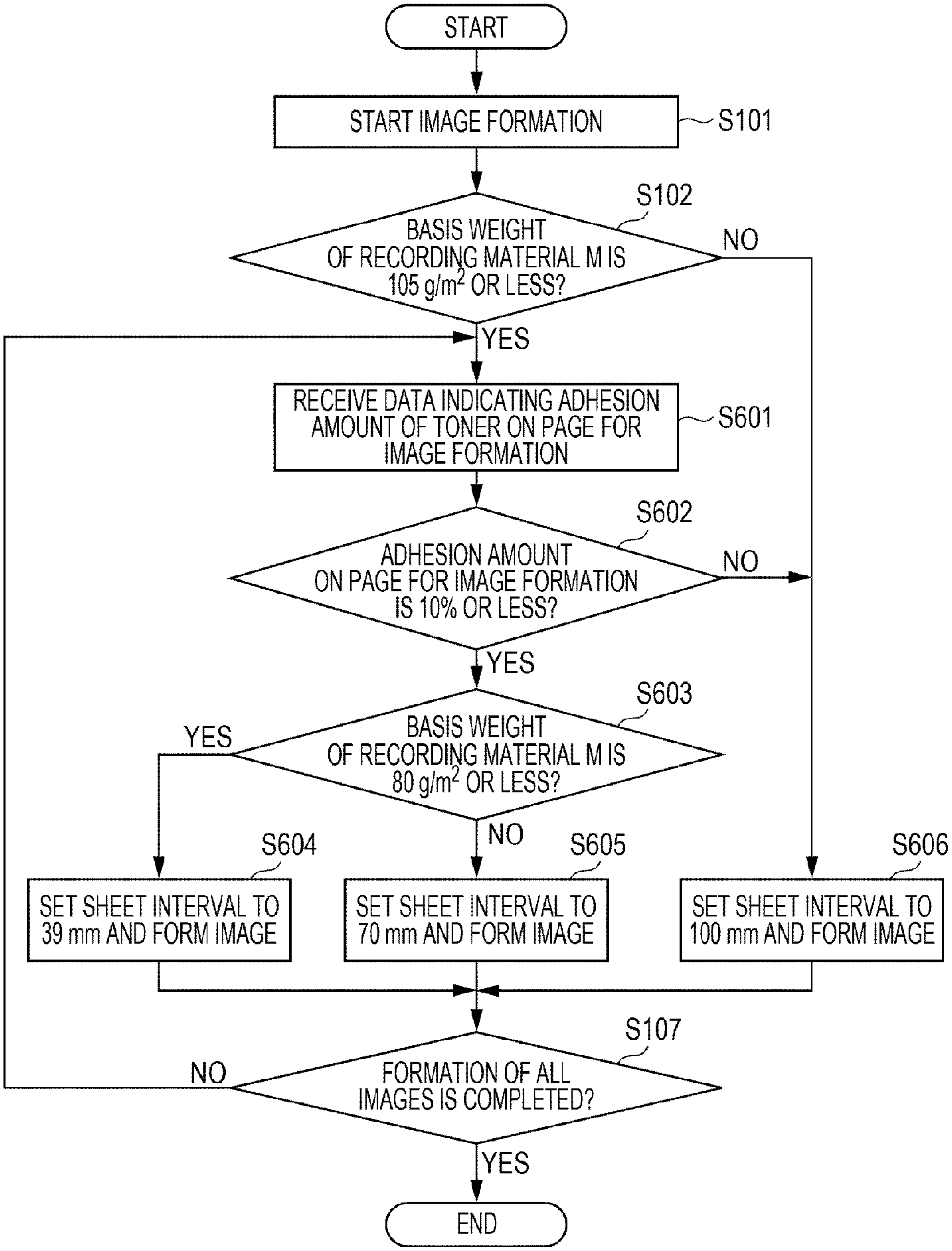
FIG. 12 is a flowchart illustrating a method of controlling a sheet interval on the basis of an adhesion amount of toner.

FIG. 12 is a flowchart illustrating a method of controlling a sheet interval, serving as a distance between conveyed recording materials, based on a kind of the recording material and an adhesion amount of toner. The same steps as those in the above-described flowchart of FIG. 3 are designated by the same reference numerals and description thereof is omitted. In S601, the CPU 204 receives data indicating an adhesion amount of toner from the controller 201. In S602, the CPU 204 determines based on the received data whether the adhesion amount is less than or equal to 10%. If the adhesion amount is not less than or equal to 10%, the CPU 204 sets the sheet interval to 100 mm and allows image formation in S606. If the adhesion amount is less than or equal to 10%, the CPU 204 determines in S603 whether the basis weight of the recording material M is less than or equal to 80 g/m$^2$. If the basis weight of the recording material M is less than or equal to 80 g/m$^2$, the CPU 204 sets the sheet interval to 39 mm and allows image formation in S604. If the basis weight of the recording material M is not less than or equal to 80 g/m$^2$, the CPU 204 sets the sheet interval to 70 mm and allows image formation in S605.

The case where the adhesion amount is expressed as a percentage has been described as an example. The criterion is not limited to a value expressed as a percentage. The adhesion amount itself can be obtained by, for example, pixel counting and can be compared with a threshold value.

As described above, to form a color image, the sheet interval is controlled in consideration of the kind of the recording material M on which an image is to be formed and the adhesion amount. Consequently, while the sheet interval is appropriately controlled without changing an image forming condition, printing can be performed at throughput suitable for the kind of the recording material and the printing ratio such that image quality does not vary in a single recording material. The above-described sheet intervals are examples in the configuration in the present embodiment and may be appropriately changed as, for example, the melting point of toner, the capacity of the power supply for heating the fixing device, or the structure of the pressure roller varies. Furthermore, the threshold values for determination of the kind of the recording material M and the threshold value for determination of the adhesion amount are examples in the configuration in the present embodiment and may be appropriately changed as, for example, the melting point of toner, the capacity of the power supply for heating the fixing device, or the structure of the pressure roller varies.

Fifth Embodiment

The first to fourth embodiments have been described with respect to the methods of controlling a sheet interval on the basis of a kind of the recording material M and a printing ratio or an adhesion amount of toner. The present embodiment will be described with respect to a method of controlling a sheet interval on the basis of whether graphic data is included in image data of an image to be formed.

Figure 13:
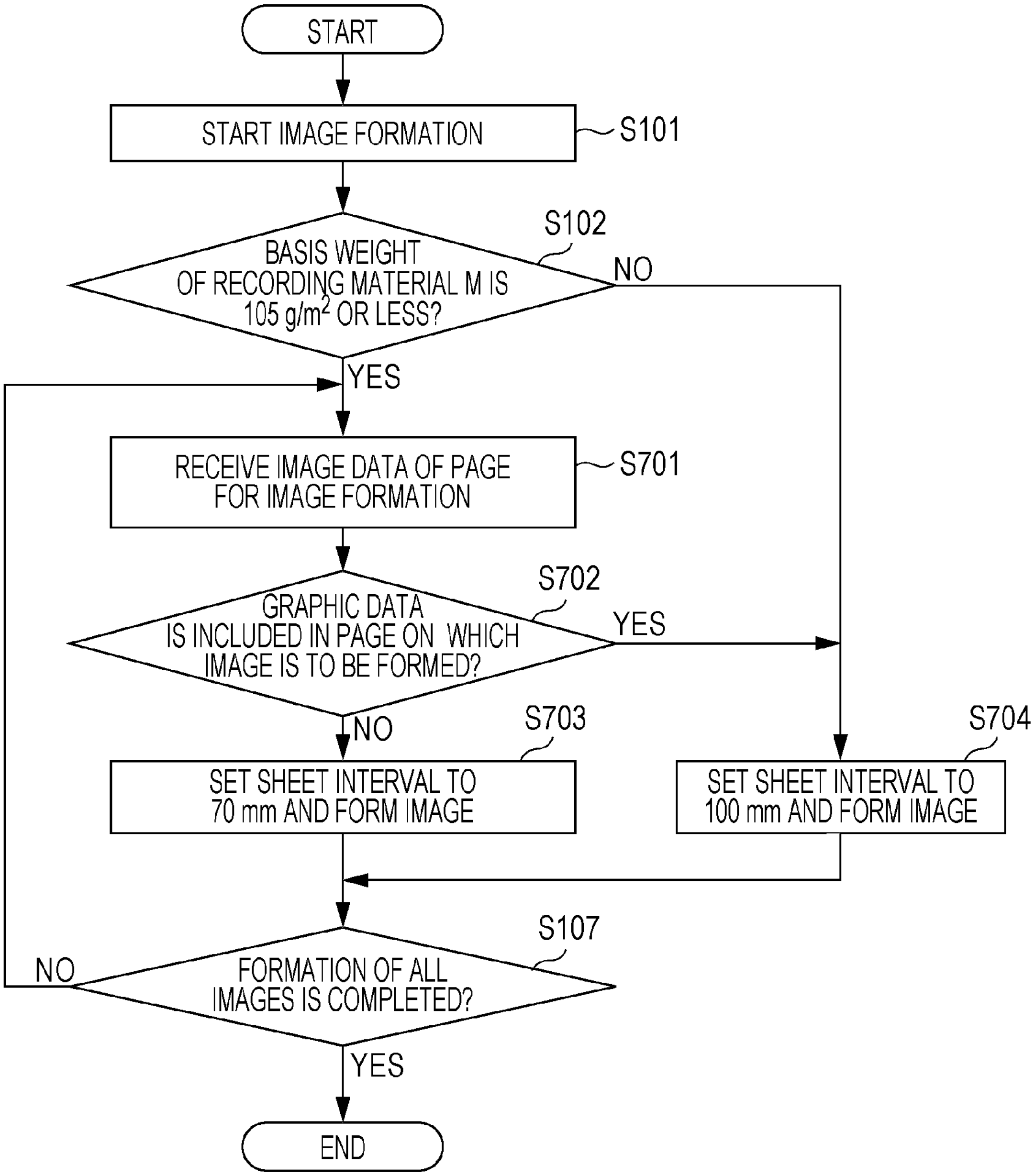
FIG. 13 is a flowchart illustrating a method of controlling a sheet interval on the basis of whether graphic image is included in an image to be formed.

FIG. 13 is a flowchart illustrating the method of controlling a sheet interval, serving as a distance between conveyed recording materials, based on a kind of the recording material M and the presence or absence of graphic data. The same steps as those in the above-described flowchart of FIG. 3 are designated by the same reference numerals and description thereof is omitted. In S701, the CPU 204 receives image data from the controller 201. In S702, the CPU 204 determines based on the received image data whether graphic data is included in a page on which an image is to be formed. If graphic data is not included, the CPU 204 sets the sheet interval to 70 mm and allows image formation in S703. If graphic data is included, the CPU 204 sets the sheet interval to 100 mm and allows image formation in S704.

As described above, the sheet interval can be controlled such that when graphic data is not included, the sheet interval is reduced because the amount of toner is small, and when graphic data is included, the sheet interval is increased because the amount of toner is large. Consequently, printing can be performed at throughput suitable for the kind of the recording material and the printing ratio without changing an image forming condition such that image quality does not vary. The above-described sheet intervals and the threshold value for determination of the kind of the recording material M are examples in a configuration in the present embodiment and may be appropriately changed as, for example, the melting point of toner, the capacity of the power supply for heating the fixing device, or the structure of the pressure roller varies.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-275141 filed Dec. 9, 2010 and No. 2011-200625 filed Sep. 14, 2011, which are hereby incorporated by reference herein in their entirety.

What is claimed is:

1. An image forming apparatus comprising:

a forming unit configured to form an image on a recording material;

a receiving unit configured to receive information regarding a kind of the recording material;

a conveying unit configured to convey the recording material; and a control unit configured to, when the forming unit successively forms images on a plurality of recording materials, control a sheet interval, serving as a distance between a trailing edge of a preceding recording material and a leading edge of a succeeding recording material conveyed through the conveying unit, based on the received information regarding the kind of the recording material, wherein the control unit is configured to compare a basis weight of a first recording material obtained from the information regarding the kind of the recording material with a first threshold value, set the sheet interval to a first distance when the basis weight is greater than the first threshold value, compare a value related to a printing ratio of an image formed on a second recording material, which is a last recording material that precedes the first recording material, with a second threshold value when the basis weight is equal to or smaller than the first threshold value, set the sheet interval to a second distance shorter than the first distance when the printing ratio of the image formed on the second recording material is greater than the second threshold value, and set the sheet interval to a third distance shorter than the second distance when the value related to a printing ratio of the image formed on the second recording material is equal to or smaller than the second threshold value.

2. The image forming apparatus according to claim 1, wherein the conveying unit includes registration rollers configured to convey the recording material and a registration shutter configured to correct skew of the recording material conveyed through the registration rollers.

3. The image forming apparatus according to claim 1, wherein the value related to the printing ratio is a value related to the number of toner dots to be transferred onto the recording material.

4. The image forming apparatus according to claim 1, wherein the value related to the printing ratio is a value related to the number of toner dots per unit area.

5. An image forming apparatus comprising:

a forming unit configured to form an image on a recording material;

a receiving unit configured to receive information regarding a value related to a printing ratio;

a conveying unit configured to convey the recording material; and a control unit configured to, when the forming unit successively forms images on a plurality of recording materials, control a sheet interval, serving as a distance between a trailing edge of a preceding recording material and a leading edge of a succeeding recording material conveyed through the conveying unit, based on the received information regarding the value related to the printing ratio, wherein the control unit is configured to compare a value related to a printing ratio of an image to be formed on a first recording material with a first threshold value, set the sheet interval to a first distance when the value related to a printing ratio of the image to be formed on the first recording material is equal to or smaller than the first threshold value, compare a value related to a printing ratio of an image formed on a second recording material, which is a last recording material that precedes the first recording material, with a second threshold value when the value related to a printing ratio of the image to be formed on the first recording material is greater than the first threshold value, set the sheet interval to a second distance longer than the first distance when the printing ratio of the image formed on the second recording material is equal to or smaller than the second threshold value, and set the sheet interval to a third distance longer than the second distance when the printing ratio of the image formed on the second recording material is greater than the second threshold value.

6. The image forming apparatus according to claim 5, wherein the conveying unit includes registration rollers configured to convey the recording material and a registration shutter configured to correct skew of the recording material conveyed through the registration rollers.

7. The image forming apparatus according to claim 5, wherein the value related to the printing ratio is a value related to the number of toner dots to be transferred onto the recording material.

8. The image forming apparatus according to claim 5, wherein the value related to the printing ratio is a value related to the number of toner dots per unit area.

* * * * *